United States Patent [19]

Uuskoski

[11] Patent Number: 5,382,861
[45] Date of Patent: Jan. 17, 1995

[54] ASYNCHRONOUS MOTOR AND A PROCEDURE FOR THE MANUFACTURING OF THE STATOR AND/OR ROTOR OF AN ASYNCHRONOUS MOTOR

[75] Inventor: Klaus Uuskoski, Hyvinkaa, Finland

[73] Assignee: Kone OY, Helsinki, Finland

[21] Appl. No.: 40,581

[22] Filed: Mar. 31, 1993

Related U.S. Application Data

[63] Continuation of Ser. No. 833,447, Feb. 6, 1992, abandoned.

[30] Foreign Application Priority Data

Feb. 7, 1991 [FI] Finland ................................. 910589

[51] Int. Cl.6 ........................ H02K 1/00; H02K 15/00
[52] U.S. Cl. ..................................... 310/216; 310/42;
310/45; 310/184; 310/198; 310/208; 310/215;
310/254; 310/261
[58] Field of Search ............... 310/216, 215, 211, 254,
310/261, 166, 42, 45, 259, 200, 208, 184, 179,
198; 29/596, 598; 336/135

[56] References Cited

U.S. PATENT DOCUMENTS

| | | | |
|---|---|---|---|
| 606,912 | 7/1898 | Blathy | 310/254 |
| 2,562,283 | 7/1951 | Sawyer, Sr. | 310/254 |
| 2,657,324 | 10/1953 | Korski | 29/598 |
| 3,013,168 | 12/1961 | Ellis | 310/166 |
| 3,262,000 | 7/1966 | Rediger | 310/261 |
| 3,778,652 | 12/1973 | Endress | 310/211 |
| 3,979,822 | 9/1976 | Halm | 310/42 UX |
| 4,158,225 | 6/1979 | Hertz | 310/211 |
| 4,760,300 | 7/1988 | Yoshida | 310/261 |
| 4,761,579 | 8/1988 | Savage | 310/179 |
| 4,854,034 | 8/1989 | Archibald | 29/598 |
| 4,868,438 | 9/1989 | Okamoto | 310/166 |
| 4,871,934 | 10/1989 | Okamoto | 310/166 |
| 5,053,658 | 10/1991 | Fakler | 310/42 |
| 5,173,651 | 12/1992 | Buckley et al. | 310/254 |

OTHER PUBLICATIONS

Nutenschragung, Von Dr—Ing E. Krubler, Elektrotechnische Zeitschrift, 55th Annual vol., Issue 46, Nov. 15, 1934, p. 1117.9.

Kafigwicklungen Von Asychronmaschinen, Von Hoffman V. J. et al., Technische Rundschau Nr. 10 vom., Mar. 11, 1966.

Kafigwicklungen Von Asychronmaschinen, Von Hoffman V. J. et al., Technische Rundschau Nr. 10 vom., Mar. 25, 1966.

*Primary Examiner*—R. Skudy
*Attorney, Agent, or Firm*—Sughrue, Mion, Zinn, Macpeak & Seas

[57] ABSTRACT

An asynchronous motor is disclosed with stator and rotor windings placed in respective grooves, at least one of the windings being a cast winding. The grooves on the stator and those on the rotor are so inclined relative to each other that the groove inclination is approximately 60 to 90% of the pole pitch. In addition, to enhance the effect of the groove inclination, the stator and/or rotor is subjected, after the casting of the windings, to a heat treatment process in which the stator and/or rotor is heated to a high temperature and then cooled. The invention facilitates construction of an asynchronous motor having a reduced magnitude of generator torque of the motor and a changed rotational speed at which it occurs in relation to a conventional asynchronous motor.

8 Claims, 4 Drawing Sheets

ASYNCHRONOUS MOTOR AND A PROCEDURE FOR THE MANUFACTURING OF THE STATOR AND/OR ROTOR OF AN ASYNCHRONOUS MOTOR

This is a continuation of application No. 07/833,447 filed Feb. 6, 1992 now abandoned.

FIELD OF THE INVENTION

The present invention relates to an asynchronous motor and to a procedure for the manufacturing of the stator and/or rotor of an asynchronous motor.

BACKGROUND TO THE INVENTION

As is well known in the art, a conventional squirrel-cage motor has a large generator torque, which is the torque braking the motor when it rotates in the normal direction at an over-synchronous speed and with a negative slip. In the case of single-speed squirrel-cage motors this situation seldom occurs, but it occurs frequently in the case of pole-changing motors. In pole-changing motors, e.g. in the traversing and hoisting motors of cranes, a generator torque typically occurs when the braking effect of the generator torque is utilized in transitions from a higher motor speed to a lower speed. A large generator torque is a disadvantage because it has to be taken into account e.g. in the dimensioning of the gears. A large generator torque may also result in an undesirably high deceleration rate.

An excessive generator torque can be reduced by adjusting the stator voltage by means of various regulators during the time when a generator torque is present.

The motor structure itself can also be used to influence the magnitude of the generator torque and the rotational speed at which the maximum generator torque occurs. One of the previously known methods used to reduce generator torque is to increase the number of turns in the stator or rotor windings.

Similarly, the sectional form of the stator or rotor grooves can be utilized to influence the magnitude of the generator torque. In the case of small motors, however, a sufficient groove depth cannot be achieved because of the small size of the motor.

As is known in the art, the inclination of the grooves can also be used as a means of influencing the magnitude of the generator torque and the rotational speed at which a maximum generator torque occurs. A change in the groove inclination also effects the magnitude of slip on the motor side of the motor's power curve. A large motor slip is a drawback in parallel-operated drive motors, particularly in traversing or hoisting mechanisms of cranes, because it results in skewing of the crane or its load.

Groove inclination in this context means the inclination of the grooves in terms of a percentage of the pole pitch. In conventional asynchronous motors the groove inclination is, at its maximum, about 40% of the pole pitch.

In motors provided with cast windings, groove inclinations exceeding this value have not been used for the purpose of altering the generator torque. The normal groove inclination, i.e. an inclination of about 40%, has been used in motors with cast windings only for reducing the noise levels and overharmonic torques of the motor, and for improving the motor performance.

The circumstances referred to above constitute a limitation on the use of pole-changing motors with cast windings.

SUMMARY OF THE INVENTION

It is therefore an object of the present invention to provide an asynchronous motor which overcomes many of the above-stated drawbacks.

It is another object of the invention to provide a novel method of manufacturing an asynchronous motor.

According to an aspect of the invention there is provided an asynchronous motor comprising a rotor, a stator, and rotor and stator windings disposed in respective grooves of said rotor and said stator; wherein the grooves of the stator and the rotor are disposed at an oblique orientation relative to each other so that the groove inclination of the motor is in the range of 60 to 90% of a pole pitch of the motor; and the rotor and/or stator windings are cast windings fabricated according to a method in which, after casting of the rotor and/or stator winding, the rotor and/or stator (as appropriate) is subjected to a heat treatment which comprises heating the rotor and/or stator to a high temperature and then cooling it.

According to another aspect of the invention, there is provided a method of manufacturing a rotor and/or stator of an asynchronous motor in which the rotor and stator windings of the motor are formed in respective grooves in the rotor and stator, and at least one of the windings is a cast winding, said method comprising forming grooves in the rotor and/or stator such that the grooves on the stator and the rotor are at an oblique orientation relative to each other such that the groove inclination of the motor is approximately 60 to 90% of the pole pitch; forming the rotor and/or stator windings within the respective grooves of the rotor and/or stator grooves by casting; and after the formation of the windings, subjecting the rotor and/or stator (as appropriate) to heat treatment wherein the rotor and/or stator is heated to a high temperature and then cooled.

The present invention allows the generator torque of asynchronous motors with cast stator/rotor windings to be reduced without notably changing the slip on the motor side of the power curve.

The invention is generally characterized in that the stator and rotor cores are provided with grooves placed in an exceptionally oblique position, i.e. approximately 60 to 90% of the pole pitch relative to each other. After the windings have been cast the stator and/or rotor (i.e. the parts in which windings have been cast) is subjected to a heat treatment process to allow the effect of the groove inclination to be manifested. The heat treatment consists of heating the stator and/or rotor to a high temperature and then cooling it rapidly.

In a motor constructed according to the invention, the generator torque is reduced while the slip remains essentially unchanged.

Physically, the heat treatment causes the cast winding to be suitably detached from the winding grooves due to the elongation resulting from heating and the contraction resulting from cooling.

In a preferred embodiment of the invention, the walls and bottoms of the stator/rotor winding grooves, which have an inclination of approximately 60 to 90% of the pole pitch relative to each other, are provided with a heat-resistant insulation before the windings are cast.

This embodiment standardizes the heat treatment. The use of a thin layer of insulating material between the groove wall and the cast winding allows the cast winding to be suitably detached from the groove. Consequently, the forces applied to the cast winding due to thermal elongation are reduced, which means that the occurrences of winding breakage during heat treatment are reduced. Another advantage of this embodiment is that after heat treatment, the cast bars remain in a more tension-free state, which means that the characteristics of the motor will not change substantially during its service life. The insulating material may consist of e.g. liquid substances which, after drying or hardening, form a very thin insulating film on the groove surfaces.

BRIEF DESCRIPTION OF THE DRAWINGS

Further objects, features and advantages of the invention will become apparent to those skilled in the art from the following description thereof when taken in conjunction with the accompanying drawings, in which.

DETAILED DESCRIPTION OF A PREFERRED EMBODIMENT

Figure 1B:
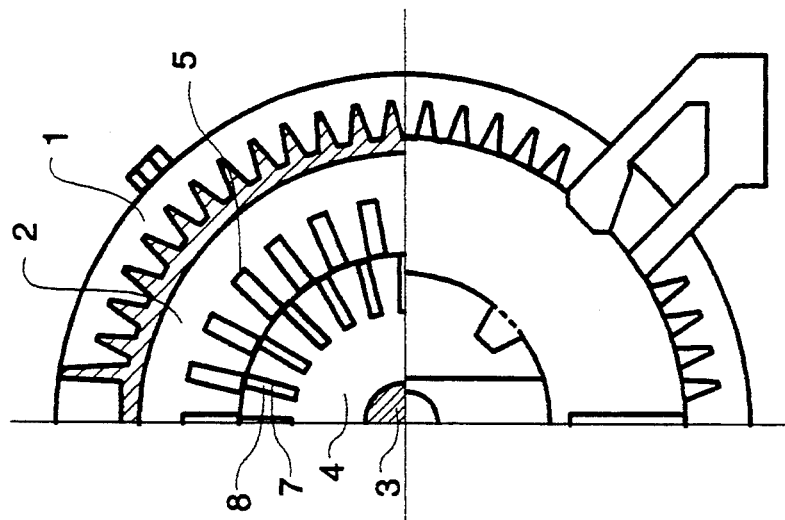
FIGS. 1a and 1b present a cross-section of an embodiment of the squirrel-cage motor of the invention as seen from one side and from one end.
Figure 1A:
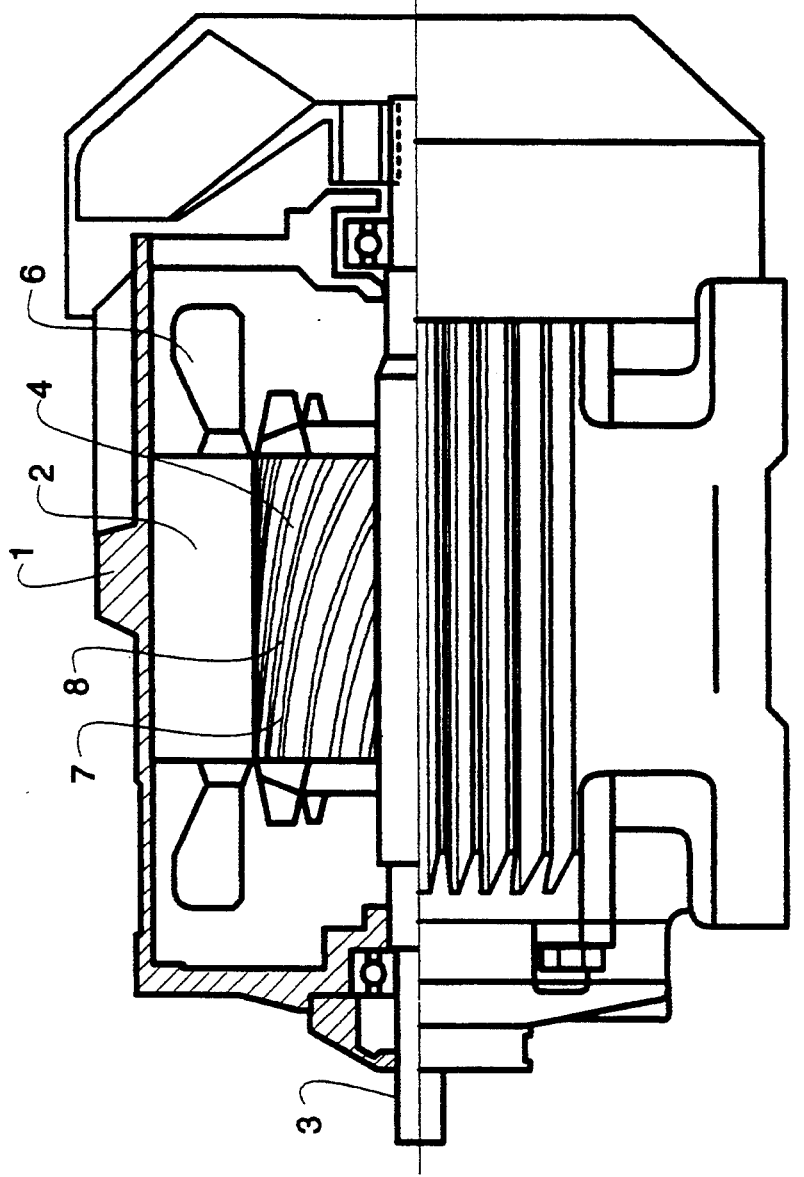

FIGS. 1a and 1b illustrate a squirrel-cage motor according to the invention. A frame 1 houses a stator core 2 and a rotor core 4. The latter is made of a ferromagnetic material and rotates with the shaft 3 of the motor. The stator is provided with a wire winding 6 while the rotor is provided with a squirrel-cage winding 8 cast in rotor grooves 7.

According to the invention, to reduce the generator torque, the stator and rotor cores 2 and 4 are provided with respective grooves 5,7 placed in an exceptionally oblique orientation relative to each other, with an inclination of approximately 60 to 90% of the pole pitch. In addition, after the rotor winding 8 has been cast, the rotor 4 is subjected to a heat treatment process designed to allow the effect of the groove inclination to be manifested. The heat treatment consists of heating the rotor to a high temperature and then cooling it rapidly.

In addition, the walls of the rotor winding grooves 7 can be treated with a heat-resistant insulating material before the windings are cast.

Figure 2:
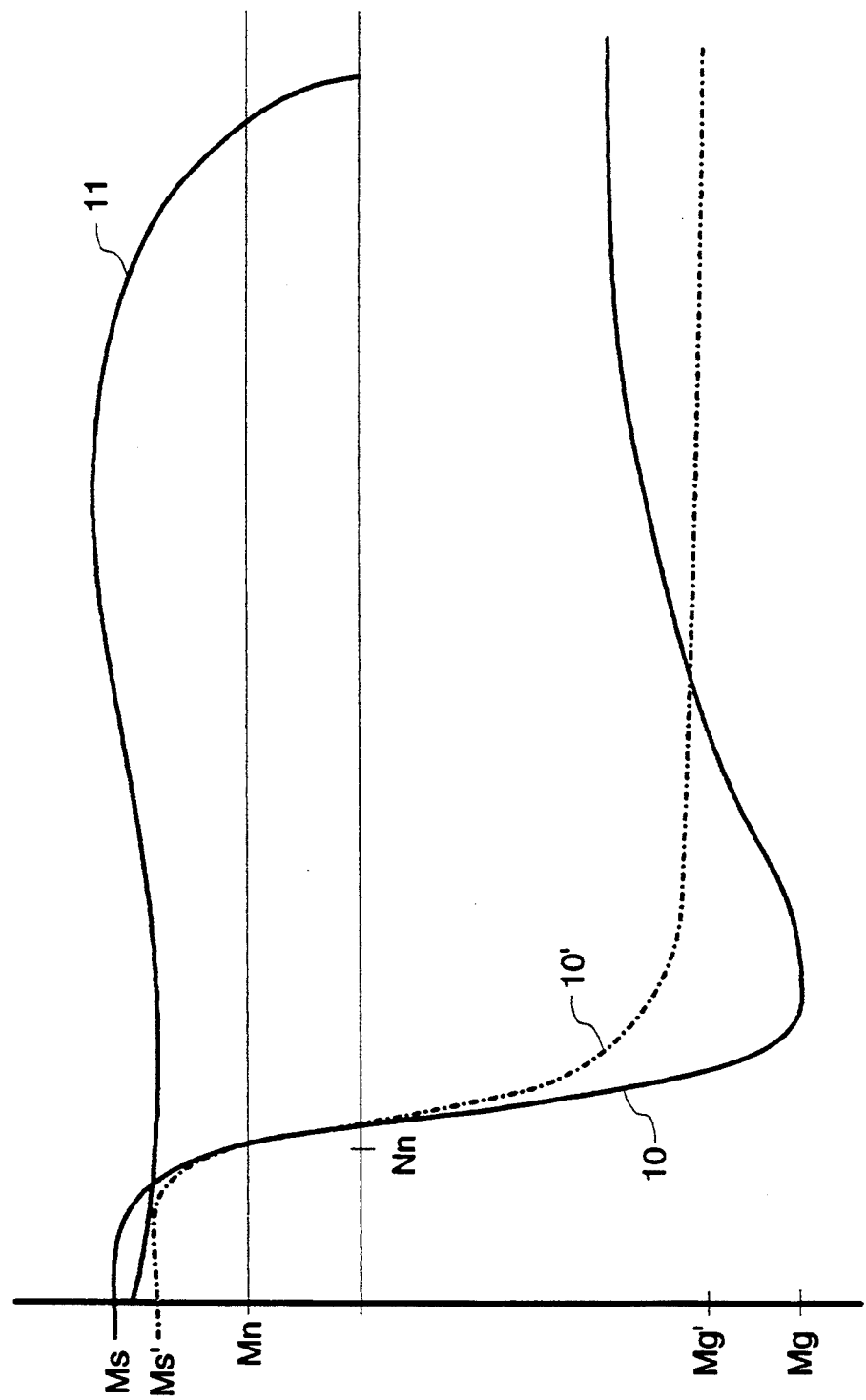
FIG. 2 presents the torque of the squirrel-cage motor of FIG. 1 as a function of rotational speed before and after heat treatment.
Figure 3:
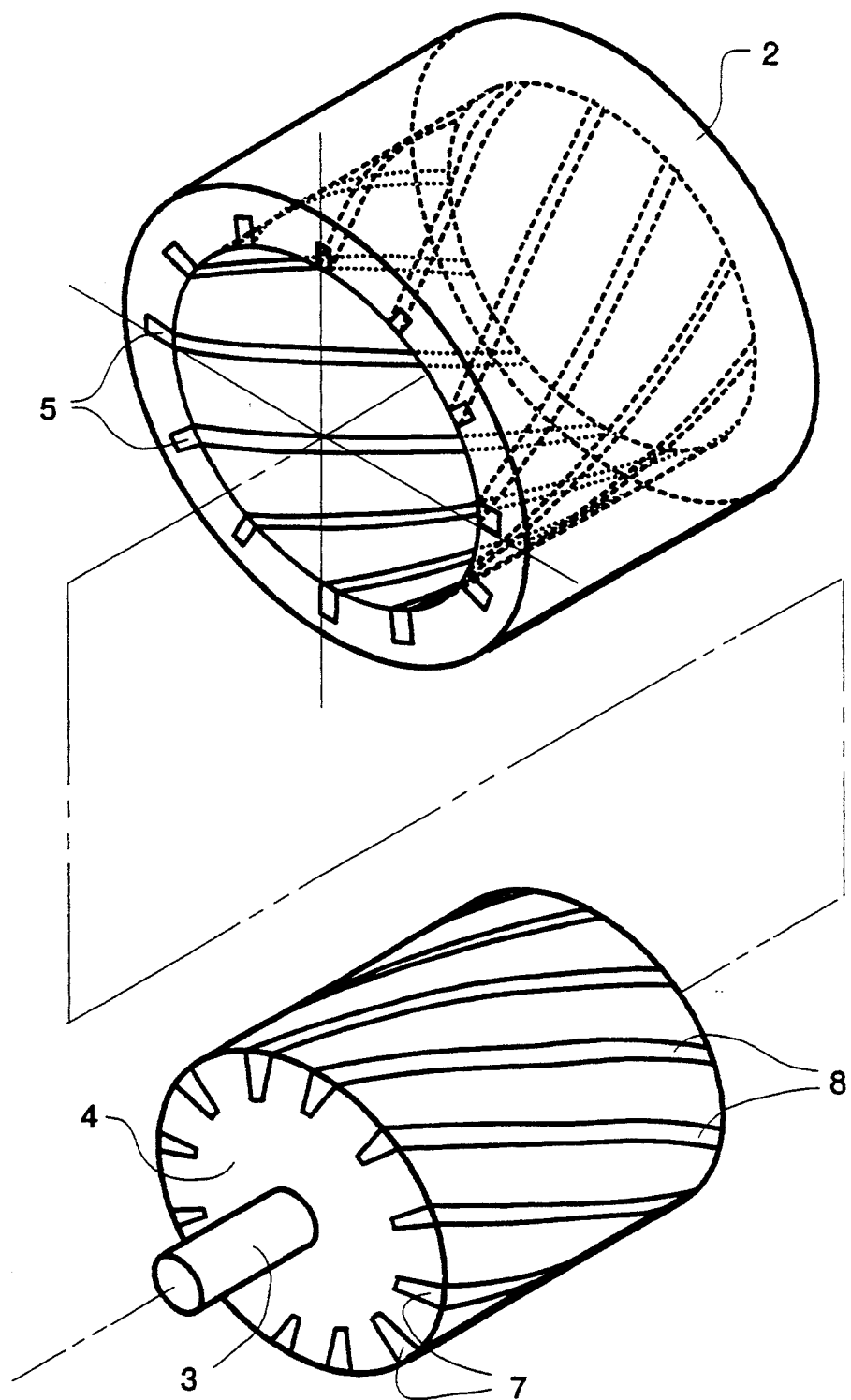
FIG. 3 shows a perspective illustration of the rotor and stator of a motor according to an embodiment of the present invention.
Figure 4B:
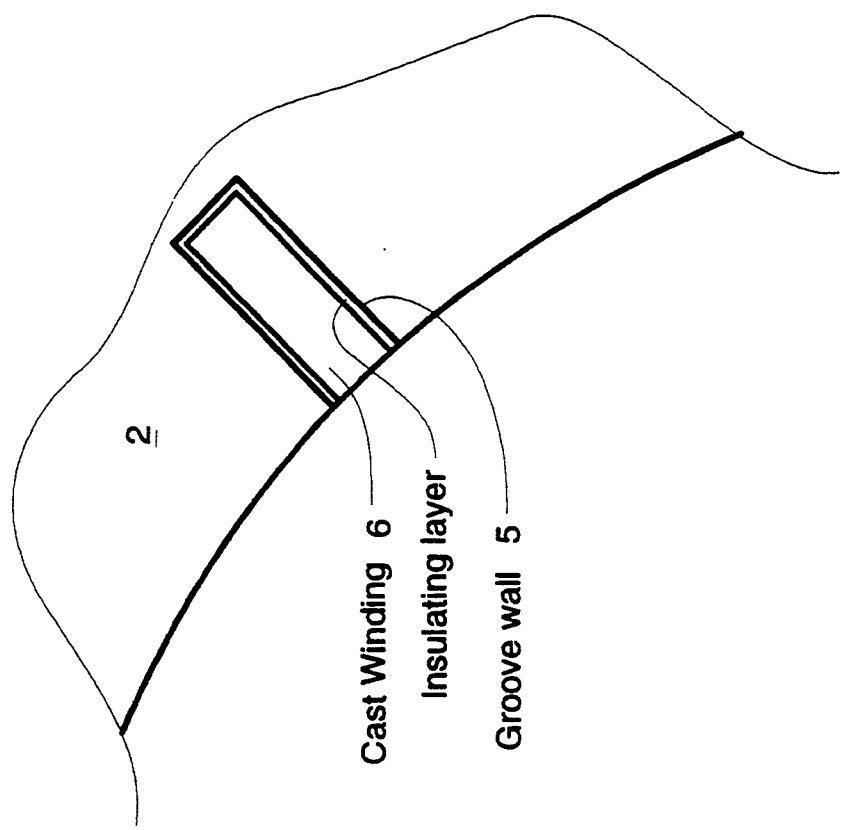
FIGS. 4a and 4b illustrate the arrangement between cast windings, thin layers of insulating material and groove walls in a respective rotor and stator according to the present invention.
Figure 4A:
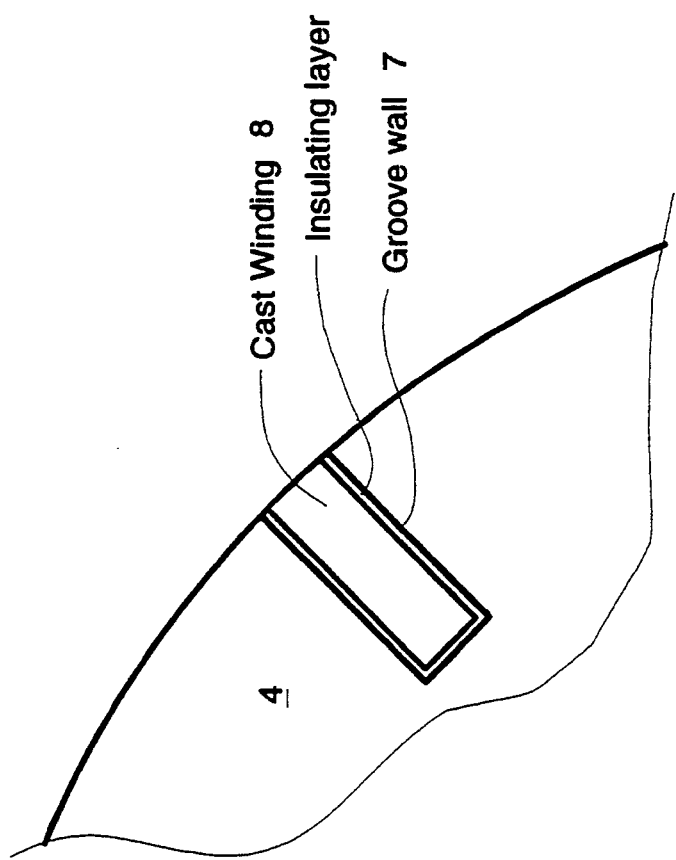

In the diagram in FIG. 2, the horizontal axis represents the relative rotational speed and the vertical axis represents the relative torque of the motor. Curve 10 represents the motor torque value as a function of rotational speed in the case of a pole-changing motor constructed as provided by the invention and having a speed ratio of 1:6, a cast-aluminium squirrel-cage winding and a groove inclination of 65% of the pole pitch for the lower speed, before the motor has been subjected to heat treatment. The torque curves for previously known pole-changing motors with a groove inclination of 40% of the pole pitch are essentially of the same shape as curve 10, both without and after heat treatment.

MS represents the value of the starting torque for the lower speed. Mg represents the generator torque peak value for the lower speed. Curve 11 represents the value of the load torque, Mn the nominal torque and Nn the nominal speed of rotation of the motor. Curve 10' represents the torque of the same motor as curve 10, but in this case the motor has been subjected to a heat treatment process as provided by the invention. It can be seen that the torque on the generator side of the motor curve, developed by the winding for the lower speed, is now essentially reduced while the motor speed with the load torque remains essentially unchanged, i.e. the motor slip has not increased, thus manifesting the effect of the large groove inclination. The generator torque peak value Ma' for the lower speed has been reduced by some 20% as compared to the corresponding value Mg for a motor without heat treatment. Both of these facts, the reduction in the generator torque and the essentially unchanged slip, are advantages achieved by the invention.

Further, it can be observed that the starting torque Ms' for the lower speed is somewhat reduced by the heat treatment as compared to the starting torque Ms without heat treatment. However, the procedure of the invention does not reduce the starting torque too much, so that the starting torque value Ms' achieved is still sufficient e.g. for demanding crane drive applications.

The heat treatment of the invention can be applied either to the stator or the rotor or even to both if both have a cast winding. Often the stator of a motor has a wire winding, as is the case in the present example, in which case only the rotor, which has a squirrel-cage winding, is subjected to heat treatment. The effect of the exceptionally large groove inclination can be regulated by appropriately selecting the temperature and duration of the heat treatment, thus making it possible to produce motors with a desired generator torque value occurring at a desired rotational speed.

The temperature and duration of the heat treatment are also dependent on the size of the stator/rotor under treatment. In the procedure of the invention, the temperature used in the heat treatment is preferably in the range of 350° to 500° C., e.g. 400° C., and the duration of the treatment in the range of approximately 2 to 6 hours, depending on the size of the rotor and/or stator, as well as other factors.

It will be obvious to a person skilled in the art that different embodiments of the invention are not restricted to the examples described above, but that they may instead be varied within the scope of the following claims. For example, the invention is not exclusively applicable to pole-changing motors but also to single-speed motors.

We claim:

1. An asynchronous motor comprising a rotor having respective rotor winding disposed in grooves of said rotor, and a stator having respective stator windings disposed in grooves of said stator, said rotor windings being cast rotor windings, wherein;

the grooves of said rotor are inclined with respect to the grooves of said stator so that a groove inclination of the motor is in the range of 60% to 90% of a pole pitch of the motor; and said cast rotor windings are suitably detached from walls of the rotor grooves;

such that said motor displays a substantially lower generator torque and a substantially unaffected motor slip, in comparison to a conventional motor of equivalent capacity.

2. The asynchronous motor as claimed in claim 1, further comprising a thin layer of insulating material disposed between a respective one of said rotor windings and said walls defining one of said grooves of said rotor.

3. An asynchronous motor comprising a rotor having respective rotor winding disposed in grooves of said rotor, and a stator having respective stator windings disposed in grooves of said stator, said stator windings being cast stator windings, wherein;

the grooves of said rotor are inclined with respect to the grooves of said stator so that a groove inclination of the motor is in the range of 60% to 90% of a pole pitch of the motor; and said cast stator windings are suitably detached from walls of the grooves of said stator;

such that said motor displays a substantially lower generator torque and a substantially unaffected motor slip, in comparison to a conventional motor of equivalent capacity.

4. The asynchronous motor as claimed in claim 3, further comprising a thin layer of insulating material disposed between a respective one of said stator windings and said walls defining one of said grooves of said stator.

5. An asynchronous motor comprising a rotor, a stator, and respective rotor and stator windings disposed in respective grooves of said rotor and said stator, said rotor windings being cast rotor windings, said motor being characterized in that:

the grooves of said rotor are inclined with respect to the grooves of the stator by an amount in the range of 60% to 90% of a pole pitch of the motor; and following casting and solidification of the rotor windings, an assembly comprising the rotor and the cast rotor windings is heated to and maintained at a temperature of 350° to 500° C. for a period of time in the range of approximately 2 to 6 hours, and then rapidly cooled;

such that the motor displays a substantially lower generator torque and a substantially unaffected motor slip, in comparison with convention motor of equivalent capacity.

6. The asynchronous motor as claimed in claim 5, further comprising a thin layer of insulating material between one of said rotor windings and walls of a respective one of said grooves.

7. An asynchronous motor comprising a rotor, a stator, and respective rotor and stator windings disposed in respective grooves of said rotor and said stator, said stator windings being cast stator windings, said motor being characterized in that the grooves of said rotor are inclined with respect to the grooves of the stator by an amount in the range of 60% to 90% of a pole pitch of the motor; and following casting and solidification of the stator windings, an assembly comprising the stator and the cast stator windings is heated to and maintained at a temperature of 350° to 500° C. for a period of time in the range of approximately 2 to 6 hours, and then rapidly cooled;

such that the motor displays a substantially lower generator torque and a substantially unaffected motor slip, in comparison with convention motor of equivalent capacity.

8. The asynchronous motor as claimed in claim 7, further comprising a thin layer of insulating material between one of said stator windings and walls of a respective one of said grooves.

* * * * *